United States Patent
Hsu et al.

(10) Patent No.: US 10,824,058 B2
(45) Date of Patent: Nov. 3, 2020

(54) PROJECTOR AND WAVELENGTH CONVERSION DEVICE THEREOF

(71) Applicant: Coretronic Corporation, Hsin-Chu (TW)

(72) Inventors: Pi-Tsung Hsu, Hsin-Chu (TW); Chi-Tang Hsieh, Hsin-Chu (TW); Shang-Hsuang Wu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 15/786,461

(22) Filed: Oct. 17, 2017

(65) Prior Publication Data
US 2018/0188638 A1    Jul. 5, 2018

(30) Foreign Application Priority Data

Dec. 30, 2016   (CN) .......................... 2016 1 1254214

(51) Int. Cl.
*G03B 21/14*     (2006.01)
*G02B 26/00*     (2006.01)
(Continued)

(52) U.S. Cl.
CPC ......... *G03B 21/142* (2013.01); *G02B 26/008* (2013.01); *G03B 21/204* (2013.01); *G03B 21/2066* (2013.01); *H04N 9/3114* (2013.01); *H04N 9/3158* (2013.01); *H04N 9/3161* (2013.01); *G02B 1/11* (2013.01)

(58) Field of Classification Search
CPC .............. G03B 21/143; G03B 21/204; G03B 21/2066; G02B 26/008; G02B 1/11; H04N 9/3158; H04N 9/3161; H04N 9/3114

See application file for complete search history.

(56) References Cited

U.S. PATENT DOCUMENTS

| | | | | |
|---|---|---|---|---|
| 2011/0266578 A1* | 11/2011 | Kanisawa | ............... | H01L 24/32 257/98 |
| 2012/0156434 A1* | 6/2012 | Satoh | .................. | G02B 5/1895 428/156 |
| 2013/0049049 A1* | 2/2013 | Choi | ..................... | H01L 33/486 257/98 |
| 2013/0250544 A1* | 9/2013 | Zink | ..................... | H01L 33/505 362/84 |

(Continued)

FOREIGN PATENT DOCUMENTS

| CN | 2497341 Y | 6/2002 |
|---|---|---|
| CN | 102053468 A | 5/2011 |

(Continued)

*Primary Examiner* — Anthony J Frost

(57) ABSTRACT

A wavelength conversion device includes a substrate, a first glue substance, a wavelength conversion structure, and a second glue substance. The substrate includes a first surface, a second surface, and an axis. The first glue substance is disposed between the wavelength conversion structure and the first surface and surrounds the axis. The wavelength conversion structure is disposed on the first glue substance and surrounds the axis. The wavelength conversion structure includes a first bonding surface, a first lateral surface, and a second lateral surface. The first bonding surface faces to the first glue substance and is connected between the first lateral surface and the second lateral surface. The first lateral surface faces in the direction away from the axis, whereas the second lateral surface faces in the direction close to the axis. The second glue substance is connected to the first lateral surface and surrounds the axis.

11 Claims, 12 Drawing Sheets

(51) Int. Cl.
*H04N 9/31* (2006.01)
*G03B 21/20* (2006.01)
*G02B 1/11* (2015.01)

(56) References Cited

U.S. PATENT DOCUMENTS

2015/0185596 A1* 7/2015 Hsieh .................. G03B 21/204
                                                              353/84
2016/0139401 A1* 5/2016 Cheng .................. G02B 26/008
                                                              359/891

FOREIGN PATENT DOCUMENTS

| CN | 102334238 A | 1/2012 |
| CN | 202351489 U | 7/2012 |
| CN | 102900807 A | 1/2013 |
| CN | 103078039 A | 5/2013 |
| CN | 203489181 U | 3/2014 |
| CN | 103968332 A | 8/2014 |
| CN | 104205373 A | 12/2014 |
| CN | 104216208 A | 12/2014 |
| CN | 104379987 A | 2/2015 |
| CN | 104423130 A | 3/2015 |
| CN | 204420881 U | 6/2015 |
| CN | 104749865 A | 7/2015 |
| CN | 106129231 A | 11/2016 |
| CN | 106154702 A | 11/2016 |
| JP | 2012008177 A | 1/2012 |
| JP | 2012098442 A | 5/2012 |
| TW | 201245844 A1 | 11/2012 |

* cited by examiner

PROJECTOR AND WAVELENGTH CONVERSION DEVICE THEREOF

CROSS-REFERENCE TO RELATED APPLICATION

This application claims the priority benefit of Chinese patent application CN201611254214.7, filed on 2016 Dec. 30. The entirety of the above-mentioned patent application is hereby incorporated by reference herein and made a part of this specification.

FIELD OF THE INVENTION

The invention relates to a wavelength conversion device, and more particularly to a wavelength conversion device used for a projector.

BACKGROUND OF THE INVENTION

The frame of the conventional projector mainly includes an illumination system, a light valve and a projection lens. The illumination system can provide an illumination beam, the light valve can convert the illumination beam to an image beam, and the projection lens can project the image beam on a screen, so as to form an image on the screen. The illumination system can generate illumination beams with different colors, where its main principle is that the utilization of the good luminous efficiency of an exciting light source, such as light emitting diode (LED) or laser diode (LD) to excite phosphor powders on a phosphor wheel, thereby generating a monochromatic beam.

In the formation of the phosphor wheel, first, an adhesive layer is coated on the metal disc, and then glue mixed with phosphor powders is coated on the adhesive layer that is on the metal disc, so that the glue mixed with phosphor powders can adhere to the metal disc. The adhesive layer that is coated on the metal disc is for example an adhesive layer mixed with a high reflective material. The adhesive layer mixed with the high reflective material can reflect the laser beam that passes by the phosphor powders but not hit the phosphor powders back to the phosphor powders to achieve the chance to excite the phosphor powders, thereby increasing the wavelength conversion efficiency. In addition, a high reflective layer (e.g. mirror reflective material or white reflective material) is coated on the metal disc at first, and then the glue mixed with the phosphor powders is coated on the metal disc, so as to achieve the purpose to reflect the laser beam that passes by the phosphor powders back to the phosphor powders for exciting likewise.

However, the two kinds of the aforementioned structures of both phosphor wheels are restricted because the concentration of the phosphor powders in the phosphor glue is unable to increase more, so that using efficiency of the wavelength conversion is unable to increase, thereby affecting the whole luminous efficiency. Moreover, there is not any structure arranged at the lateral sides of the phosphor glue in the conventional phosphor wheel, so that the lateral sides of the excited phosphor glue leak a part of the light that is generated by exciting the phosphor glue, thereby influencing the whole luminous efficiency. The reason why the concentration of the phosphor powders in the phosphor glue is unable to increase is that the more the concentration of the phosphor powders is, the less the concentration of the glue is. For that reason, the bonding force between the phosphor glue and the metal disc decreases. When the phosphor wheel spins at high speed, the phosphor glue is easy to cause a risk of the separation between the phosphor glue and the metal disc due to wind shear and centrifugal force, so as to influence the reliability of the whole structure of the phosphor wheel. Therefore, people skilled in the art pay attention to how to solve the abovementioned problems indeed.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion device, which has good wavelength conversion efficiency and good structure strength.

The invention also provides a projector, which includes the wavelength conversion device having good wavelength conversion efficiency and good structure strength.

Other advantages and objects of the invention may be further illustrated by the technical features broadly embodied and described as follows.

In order to achieve one or a portion of or all of the objects or other objects, an embodiment of the invention provides a wavelength conversion device, which includes a substrate, a first glue substance, a wavelength conversion structure and a second glue substance. The substrate includes a first surface, a second surface, and an axis. The first surface is opposite to the second surface. The first glue substance is disposed on the first surface of the substrate and surrounds the axis. The wavelength conversion structure is disposed on the first glue substance and surrounds the axis. The first glue substance is disposed between the wavelength conversion structure and the first surface, and the wavelength conversion structure includes a first bonding surface, a first lateral surface, and a second lateral surface. The first bonding surface faces to the first glue substance and is connected between the first lateral surface and the second lateral surface. The first lateral surface faces in a direction away from the axis, whereas the second lateral surface faces in a direction close to the axis. The second glue substance is connected to the first lateral surface of the wavelength conversion structure, and surrounds the axis.

The invention also provides a projector, which includes an illumination system, a light valve, and a lens. The illumination system includes a light source device and a wavelength conversion device. The light source device is used to provide an exciting beam. The wavelength conversion device is disposed on the transmission path of the exciting beam, and the wavelength conversion device converts a part of the exciting beam to an illumination beam. The wavelength conversion device includes a substrate, a first glue substance, a wavelength conversion structure, and a second glue substance. The substrate includes a first surface, a second surface, and an axis. The first surface is opposite to the second surface. The first glue substance is disposed on the first surface of the substrate, and surrounds the axis. The wavelength conversion structure is disposed on the first glue substance and surrounds the axis. The first glue substance is disposed between the wavelength conversion structure and the first surface, and the wavelength conversion structure includes a first bonding surface, a first lateral surface, and a second lateral surface, where the first bonding surface faces to the first glue substance and is connected between the first lateral surface and the second lateral surface. The first lateral surface faces in a direction away from the axis, whereas the second lateral surface faces in a direction close to the axis. The second glue substance is connected to the first lateral surface of the wavelength conversion structure and surrounds the axis. The light valve is disposed on the transmission path of the illumination beam, and used to convert the illumination beam to an image beam. The lens is disposed on the transmission path of the image beam and used to convert the image beam to a projection beam.

In the wavelength conversion device according to the embodiment of the invention, its wavelength conversion structure is disposed on the substrate by the first glue substance, and the lateral sides of the wavelength conversion structure are connected to the second glue substance. Under such a structural design, the structure strength and the reliability of the wavelength conversion device can be significantly improved. In addition, the exciting beam passed by the wavelength conversion structure can be reflected or scattered by the first glue substance and the second glue substance to return to the wavelength conversion structure for exciting again, so as to effectively increase using efficiency of the wavelength conversion, thereby increasing the whole luminous efficiency.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
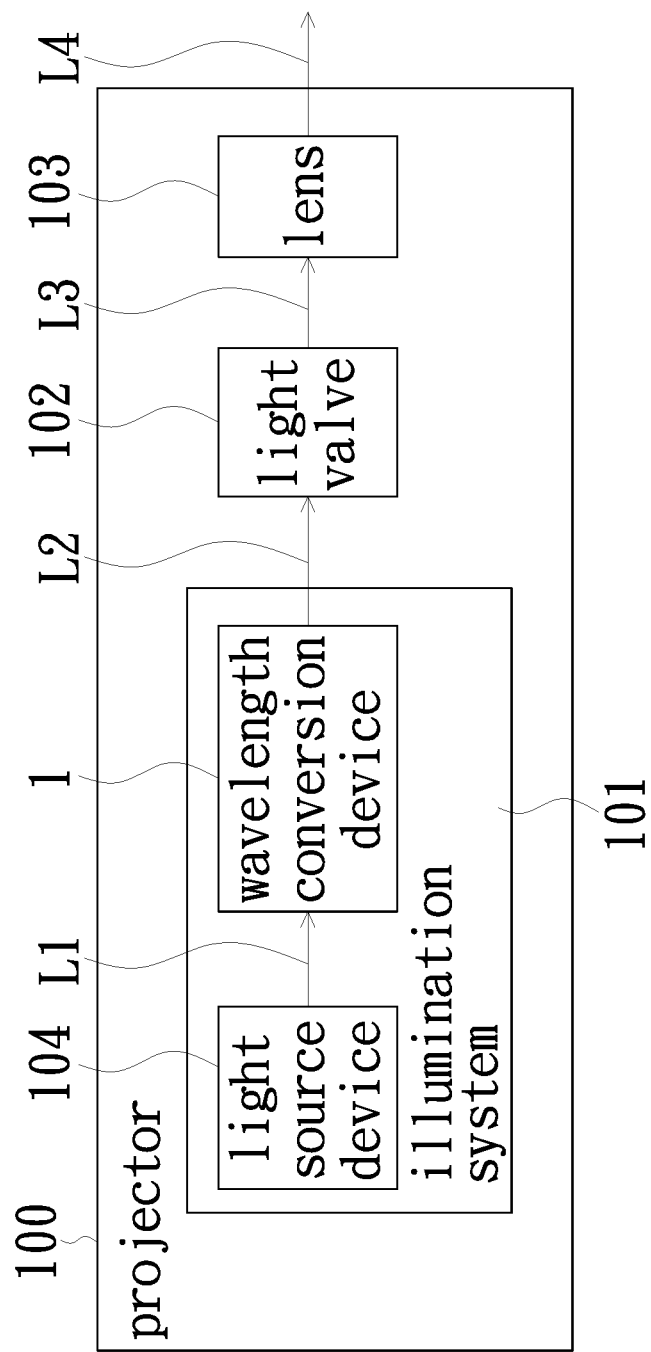
FIG. 1 illustrates a block diagram of interrelated elements of a projector according to an embodiment of the invention.

Referring to FIG. 1, FIG. 1 illustrates a block diagram of interrelated elements of a projector according to an embodiment of the invention. As shown in FIG. 1, the projector 100 of the embodiment includes an illumination system 101, a light valve 102, and a lens 103. In the embodiment, the illumination system 101 includes a light source device 104 and a wavelength conversion device 1. In the embodiment, the light valve 102 may be but not limited to a Digital Micromirror Device (DMD), a Liquid Crystal on Silicon (LCoS) or a Liquid Crystal Display (LCD). The light source device 104 of the embodiment, for example a laser diode or laser array, is used to provide an exciting beam L1. The wavelength conversion device 1 is disposed on the transmission path of the exciting beam L1. The wavelength conversion device 1 is used to convert the exciting beam L1 provided by the light source device 104 to the illumination beam L2. The light valve 102 is disposed on the transmission path of the illumination beam L2, and converts the illumination beam L2 to the image beam L3. The lens 103 is disposed on the transmission path of the image beam L3, and converts the image beam L3 to the projection beam L4.

Figure 2:
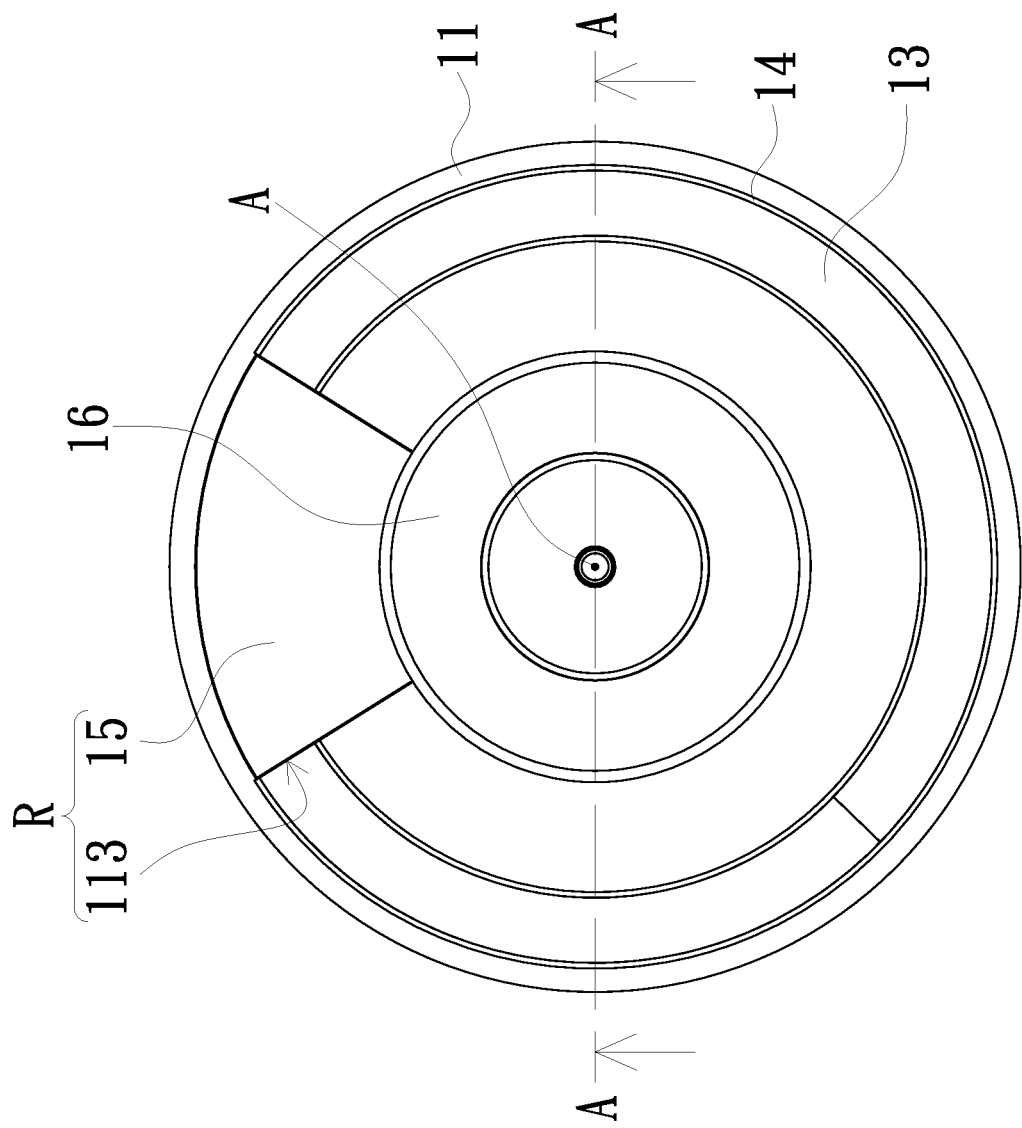
FIG. 2 illustrates a plan view of a wavelength conversion device according to an embodiment of the invention.
Figure 3:
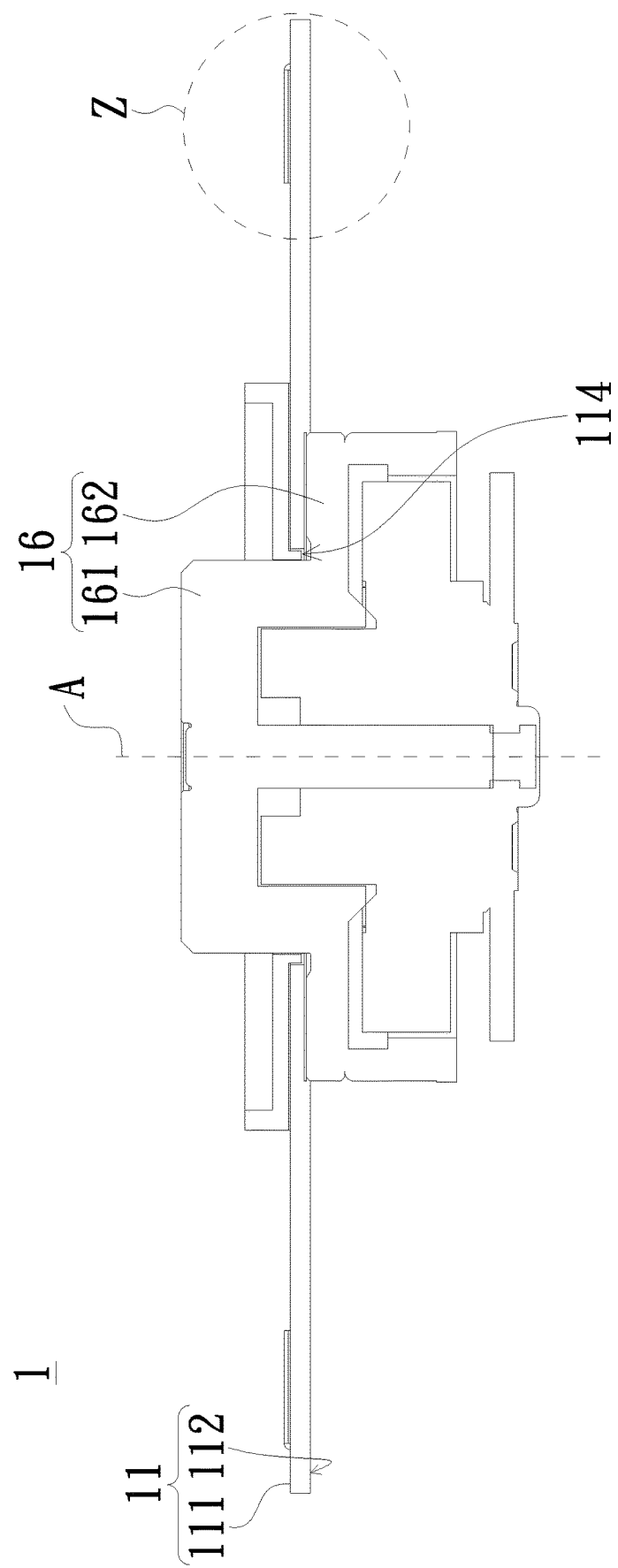
FIG. 3 illustrates a cross-sectional view along a section line A-A shown in FIG. 2.
Figure 4:
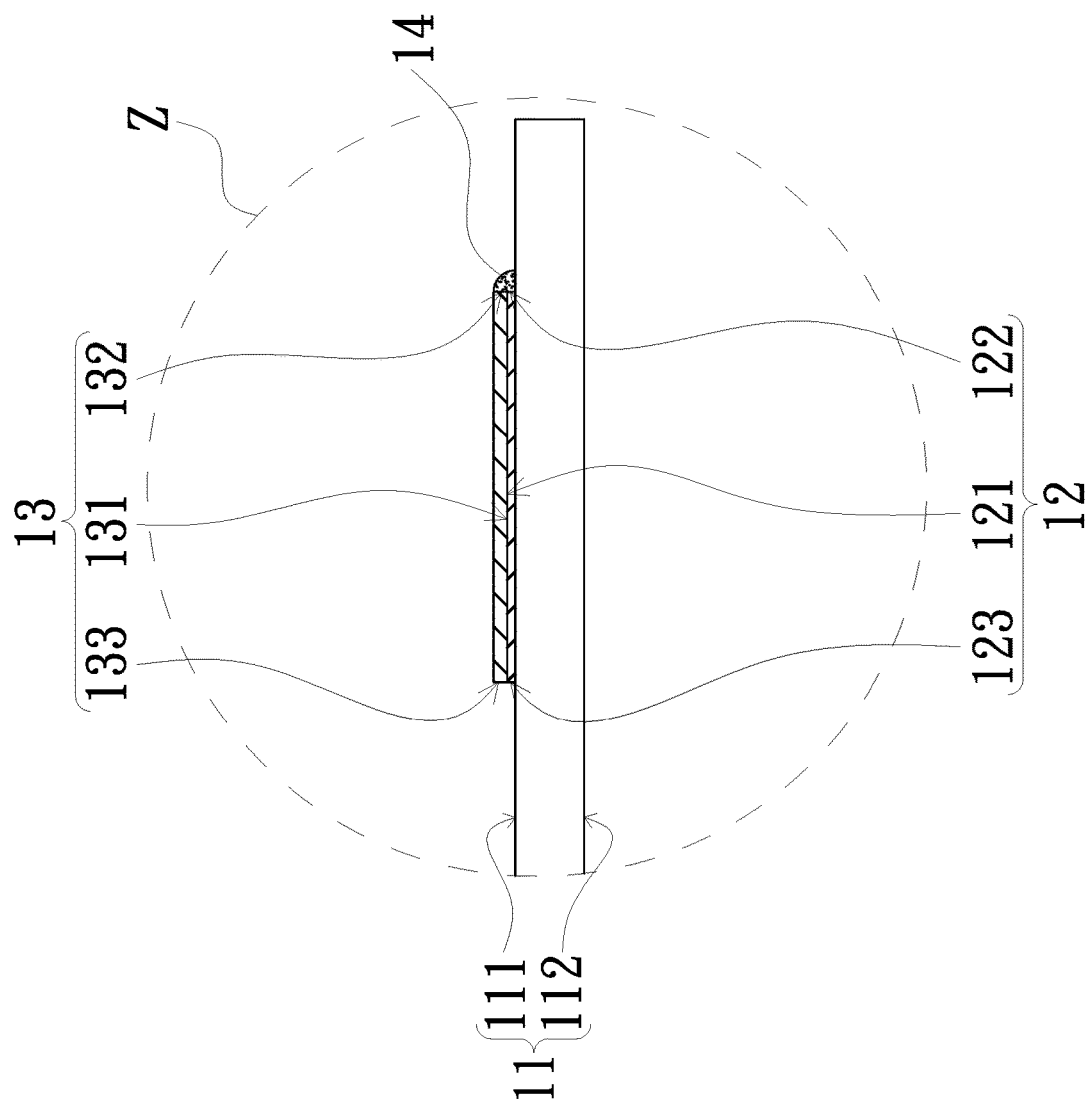
FIG. 4 illustrates an enlarged view of an area Z shown in FIG. 3.

The following is a further description of the detailed structure of the wavelength conversion device 1 of the embodiment. Referring to FIGS. 2 to 4, FIG. 2 illustrates a plan view of a wavelength conversion device according to an embodiment of the invention. FIG. 3 illustrates a cross-sectional view along a section line A-A shown in FIG. 2. FIG. 4 illustrates an enlarged view of an area Z shown in FIG. 3. As shown in FIG. 2 to FIG. 4, the wavelength conversion device 1 of the embodiment includes a substrate 11, a first glue substance 12, a wavelength conversion structure 13, and a second glue substance 14. The substrate 11 includes a first surface 111, a second surface 112, and an axis A. It is to be noted that the substrate 11 is a disk-shaped metal substrate in the present embodiment, but the invention is not limited thereto. The axis A of the substrate 11 is substantially the center of the disk-shaped metal substrate, and in other embodiment, the substrate 11 also may be a transparent substrate. The first glue substance 12 is disposed on the first surface 111 of the substrate 11 and surrounds the axis A of the substrate 11. The wavelength conversion structure 13 disposed on the first glue substance 12 and surrounding the axis of the substrate 11, which is in the extending direction perpendicular to the axis A of the first surface 111. The first glue substance 12 is disposed between the wavelength conversion structure 13 and the first surface 111 of the substrate 11. Specifically, the wavelength conversion structure 13 is attached to the substrate 11 by the first glue substance 12. In the present embodiment, the wavelength conversion structure 13 is a phosphor powders sheet made by sintering, but the invention is not limited thereto. The wavelength conversion structure 13 includes a first bonding surface 131, a first lateral surface 132, and a second lateral surface 133, where the first bonding surface 131 faces to the first glue substance 12, and the first bonding surface 131 is connected between the first lateral surface 132 and the second lateral surface 133. The first lateral surface 132 faces in the direction away from the axis A, whereas the second lateral surface 133 faces in the direction close to the axis A. The second glue substance 14 is connected to the first lateral surface 132 of the wavelength conversion structure 13 and surrounds the axis A of the substrate 11. For example, the distance between the second lateral surface 133 and the axis A is less than the distance between the first lateral surface 132 and the axis A.

As shown in FIGS. 2 to 4, the first glue substance 12 of the wavelength conversion device 1 of the embodiment includes a second bonding surface 121, a third lateral surface 122, and a fourth lateral surface 123. The second bonding surface 121 of the first glue substance 12 faces to the wavelength conversion structure 13, and the second bonding surface 121 is connected between the third lateral surface 122 and the fourth lateral surface 123. The third lateral surface 122 faces in the direction away from the axis A, whereas the fourth lateral surface 123 faces in the direction close to the axis A. For example, the distance between the fourth lateral surface 123 and the axis A is less than the distance between the third lateral surface 122 and the axis A. In the embodiment, the second glue substance 14 is not only connected to the first lateral surface 132 of the wavelength conversion structure 13, but also connected to the third lateral surface 122 of the first glue substance 12. That is, the second glue substance 14 simultaneously surrounds the first lateral surface 132 of the wavelength conversion structure 13 and the third lateral surface 122 of the first glue substance 12, but the invention is not limited thereto. The whereabouts of forming the first glue substance 12 and the second glue substance 14 may be different depending on the different methods of coating the glue. For example, in one of the embodiments, the second glue substance 14 may be only connected to the first lateral surface 132 of the wavelength conversion structure 13, but not connected to the third lateral surface 122 of the first glue substance 12. In addition, in the embodiment, since the substrate 11 is the disk-shaped structure, the first glue substance 12, the wavelength conversion structure 13, and the second glue substance 14 are arranged in a concentric ring arrangement in a radial direction from the axis A of the substrate 11.

Based on the above, since the first lateral surface 132 of the wavelength conversion structure 13 of the embodiment is connected to the second glue substance 14, not only the exciting beam passing by the wavelength conversion structure 13 is reflected or scattered back to the wavelength conversion structure 13 by the first glue substance 12 to excite the phosphor powders, but also the light beam emitted from the first lateral surface 132 of the wavelength conversion structure 13 is reflected or scattered back to the wavelength conversion structure 13 by the second glue substance 14, thereby effectively increasing the wavelength conversion efficiency. In the embodiment, the first glue substance 12 includes a first adhesive and a first reflective material, for example. The second glue substance 14, for example, includes a second adhesive and a second reflective material. By the first glue substance 12 and the second glue substance 14 consisting of the adhesive and the reflective material, the reflective abilities of the first glue substance 12 and the second glue substance 14 can be improved effectively, so that more exciting beams passing by the wavelength conversion structure 13 can be reflected by the first glue substance 12 and the second glue 14 and thus return to the wavelength conversion structure 13 to perform the exciting, thereby increasing the wavelength conversion efficiency. In the embodiment, the first adhesive and the second adhesive are each silica gel, for example. The first reflective material and the second reflective material may each be such as $TiO_2$ or $Al_2O_3$, but the invention is not limited thereto. It is to be noted that the percentage by weight of the first reflective material in the first glue substance 12 is, for example, more than or equal to 50%, and less than or equal to 70%, but the invention is not limited thereto. The percentage by weight of the second reflective material in the second glue substance 14 is, for example, more than or equal to 40%, and less than or equal to 60%, but the invention is not limited thereto. The purpose of controlling the percentage by weight of the reflective material in the previous range can cause that the first glue substance 12 and the second glue substance 14 have not only good reflective ability, but also good adhesive force.

As shown in FIG. 1 and FIG. 2, the wavelength conversion device 1 of the embodiment further includes a light-transmission component 15, and the substrate 11 further has a through recess 113. The through recess 113 extends from the first surface 111 to the second surface 112 of the substrate 11. The light-transmission component 15 is disposed in the through recess 113 to form a light penetrating area R adjacent to the wavelength conversion structure 13. In the embodiment, the wavelength conversion structure 13 is used to convert a part of the exciting beam L1 to a color light beam with a special wavelength (depending on the phosphor powders with different colors for generating color light beams with different wavelengths). The rest part of the exciting beam L1 is used to pass through the light penetrating area R. For example, the part of the exciting beam L1 excited by the wavelength conversion structure 13 and the rest part of the exciting beam L1 passing through the light penetrating area R consist of the illumination beam L2 via a light-combination device (not shown) combing light. In addition, in the embodiment, the material of the light-transmission component 15 is such as glass, but in other embodiment, the material of the light-transmission component 15 may also be plastic. Moreover, a diffusion layer may be coated on the light-transmission component 15 to eliminate laser spot phenomenon. However, the invention is not limited thereto.

As shown in FIG. 2 and FIG. 3, the wavelength conversion device 1 of the embodiment further includes a drive motor 16. In the embodiment, substrate 11 further has another through recess 114, and the center point of the through recess 114 overlaps with the axis A of the substrate 11. The drive motor 16 includes a shaft part 161 and a joint part 162 connected to each other. The drive motor 16 passes through the through recess 114 of the substrate 11 with the shaft part 161, so that the joint part 162 of the drive motor 16 is connected to the second surface 112 of the substrate 11. The drive motor 16 is used to drive the substrate 11 to rotate.

Figure 5:
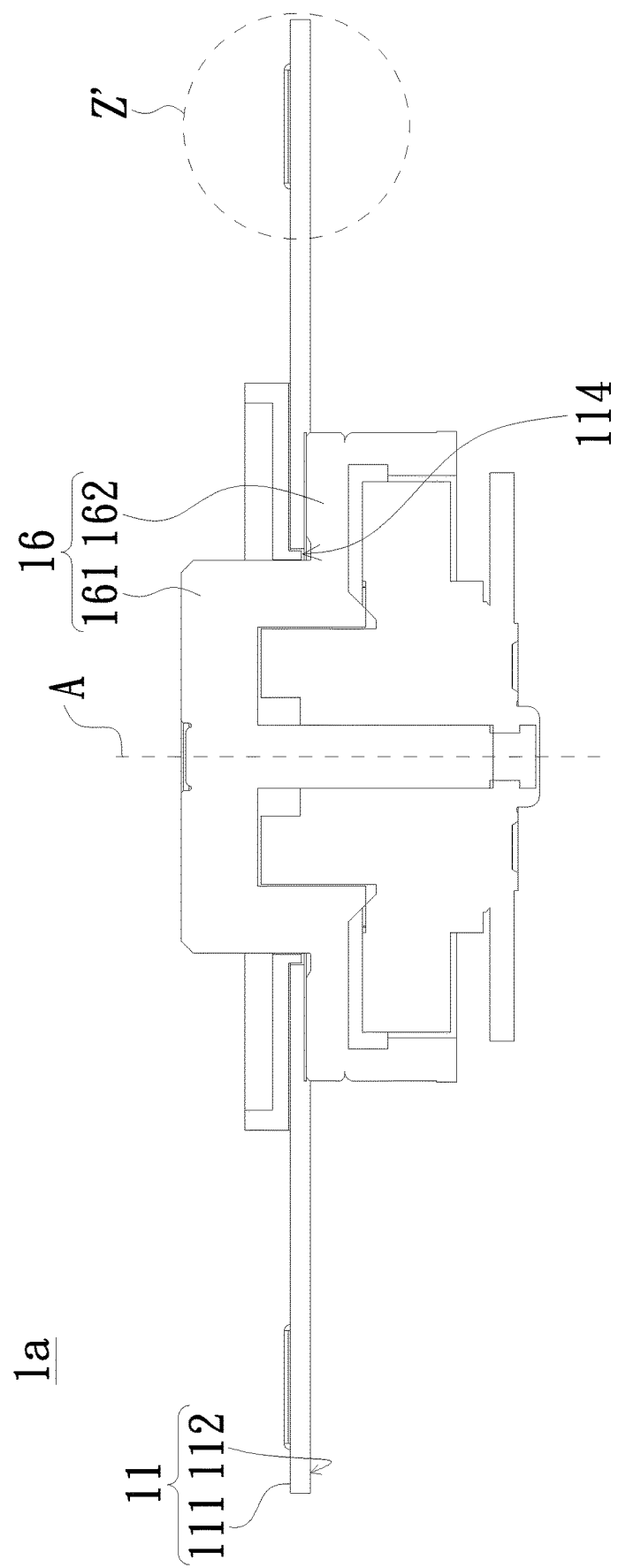
FIG. 5 illustrates a cross-sectional view of a wavelength conversion device according to another embodiment of the invention.
Figure 6:
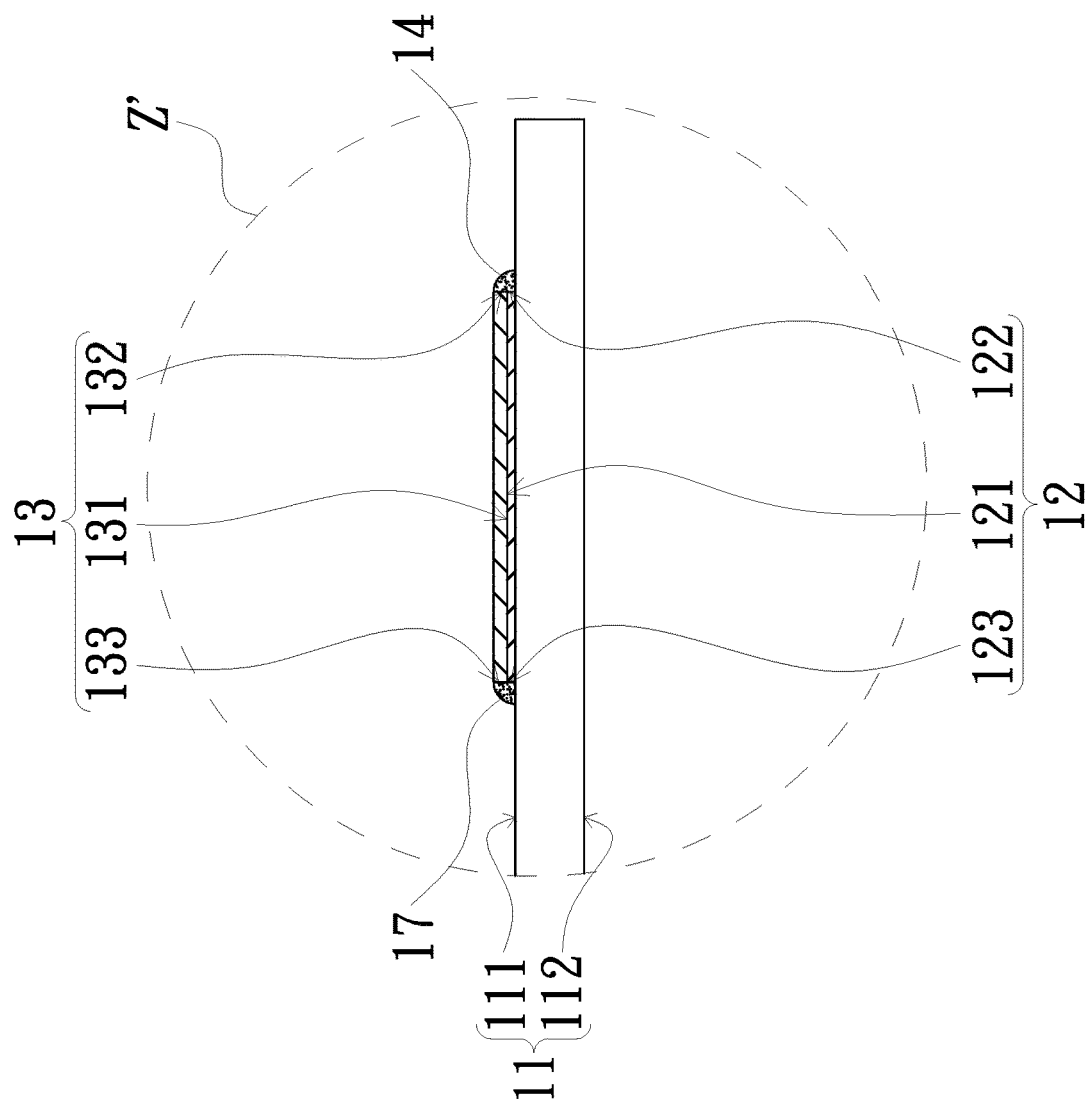
FIG. 6 illustrates an enlarged view of an area Z' shown in FIG. 5.

Referring to FIG. 5 and FIG. 6, FIG. 5 illustrates a cross-sectional view of a wavelength conversion device according to another embodiment of the invention. FIG. 6 illustrates an enlarged view of an area Z' shown in FIG. 5. As shown in FIG. 5 and FIG. 6, the wavelength conversion device 1a of the embodiment is similar to the wavelength conversion device 1 shown in FIG. 2 to FIG. 4, where the difference is that the wavelength conversion device 1a of the embodiment further includes a third glue substance 17. The third glue substance 17 is connected to the second lateral surface 133 of the wavelength conversion structure 13, and the third glue substance 17 surrounds the axis A of the substrate 11, in which the axis A along with the substrate 11 extends outward in the radial direction. The wavelength conversion structure 13 is disposed between the second glue substance 14 and the third glue substance 17. In addition, the third glue substance 17 is connected to the fourth lateral surface 123 of the first glue substance 12. The first glue substance 12, the second glue substance 14, and the third glue substance 17 are arranged in a concentric ring arrangement in a radial direction from the axis A of the substrate 11. Since the first lateral surface 132 and the second lateral surface 133 of the wavelength conversion structure 13 in the embodiment are connected to the second glue substance 14 and the third glue substance 17 respectively, not only the exciting beam passing by the wavelength conversion structure 13 is reflected or scattered back to the wavelength conversion structure 13 by the first glue substance 12 to excite the phosphor powders, but also the light beam emitted from the first lateral surface 132 of the wavelength conversion structure 13 is reflected or scattered back to the wavelength conversion structure 13 by the second glue substance 14, and the light beam emitted from the second lateral surface 133 of the wavelength conversion structure 13 is reflected or scattered back to the wavelength conversion structure 13 by the third glue substance 17, thereby effectively increasing the wavelength conversion efficiency.

Figure 7:
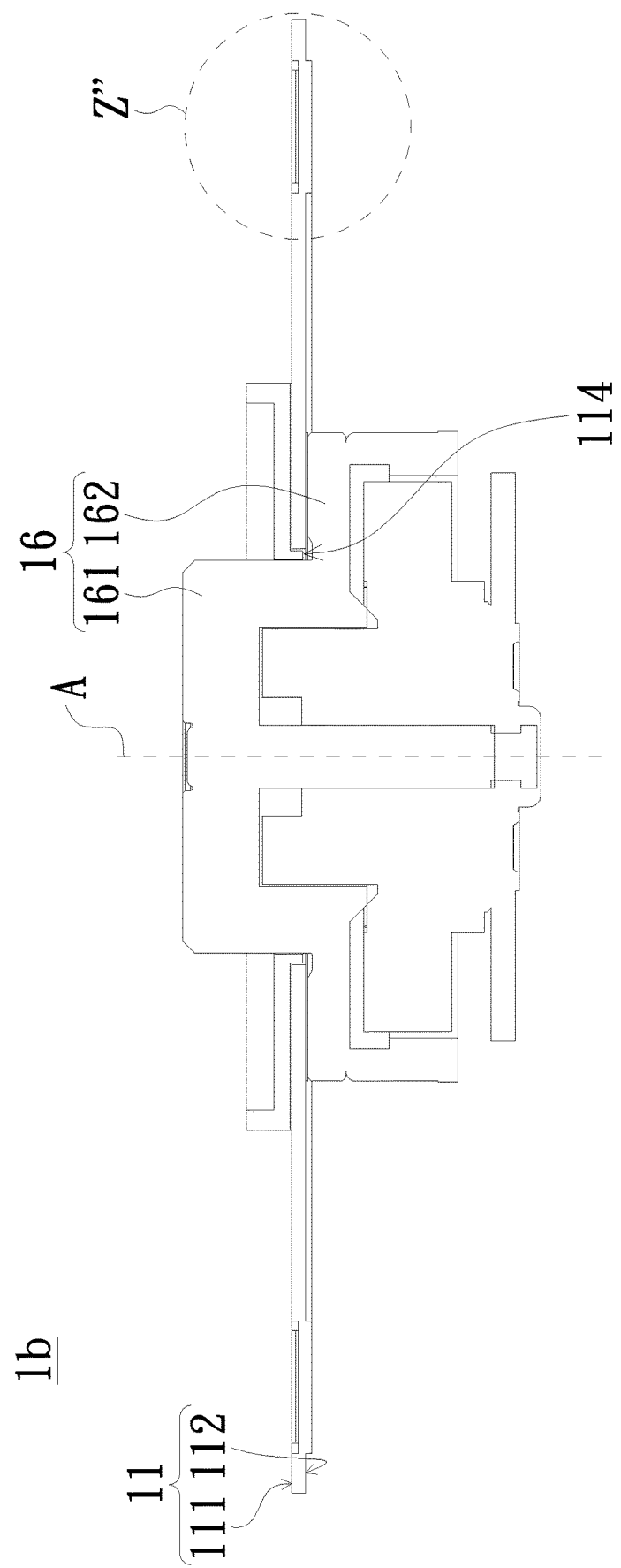
FIG. 7 illustrates a cross-sectional view of a wavelength conversion device according to another embodiment of the invention.
Figure 8:
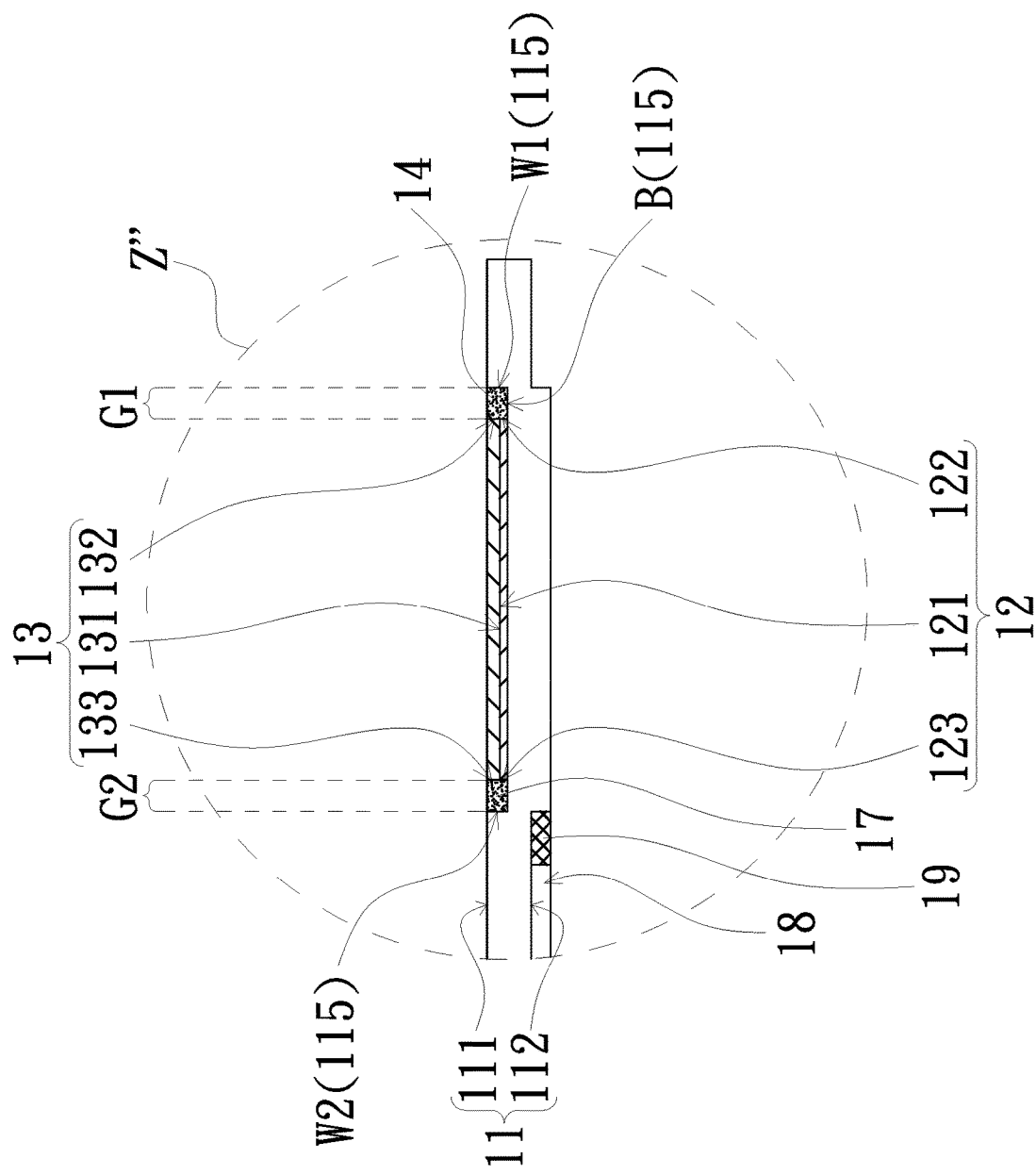
FIG. 8 illustrates an enlarged view of an area Z" shown in FIG. 7.

Referring to FIG. 7 and FIG. 8, FIG. 7 illustrates a cross-sectional view of a wavelength conversion device according to another embodiment of the invention. FIG. 8 illustrates an enlarged view of an area Z" shown in FIG. 7. As shown in FIG. 7 and FIG. 8, the wavelength conversion device 1b of the invention is similar to the wavelength conversion device 1a shown in FIG. 5 and FIG. 6, where the difference is that the substrate 11 of the wavelength conversion device 1b of the embodiment further has an accommodating recess 115, where the accommodating recess 115 is inward in the first surface 111 of the substrate 11. The accommodating recess 115 has a first inner wall W1, a second inner wall W2, and a bottom wall B, where the first inner wall W1 is opposite to the second inner wall W2, and the bottom wall B is connected between the first inner wall W1 and second inner wall W2. In the embodiment, both the first glue substance 12 and the wavelength conversion structure 13 are located in the accommodating recess 115, and in the extension direction perpendicular to the axis A of the first surface 111, the first glue substance 12 is located between the wavelength conversion structure 13 and the bottom wall B of the accommodating recess 115. In addition, there is a first gap G1 formed between the first lateral surface 132 of the wavelength conversion structure 13 and the first inner wall W1 of the accommodating recess 115, whereas there is a second gap G2 formed between the second lateral surface 133 of the wavelength conversion structure 13 and the second inner wall W2 of the accommodating recess 115. The second glue substance 14 is connected to the first lateral surface 132 of the wavelength conversion structure 13 and located in the first gap G1. The third glue substance 17 is connected to the second lateral surface 133 of the wavelength conversion structure 13 and located in the second gap G2.

It is to be noted that in the embodiment, the first gap G1 extends between the third lateral surface 122 of the first glue substance 12 and the first inner wall W1 for example, whereas the second gap G2 extends between the fourth lateral surface 123 of the first glue substance 12 and the second inner wall W2 for example. That is, there is a gap that is connected to the first gap G1 formed between the third lateral surface 122 of the first glue substance 12 and the first inner wall W1 of the accommodating recess 115, whereas there is a gap that is connected to the second gap G2 formed between the fourth lateral surface 123 of the first glue substance 12 and the second inner wall W2 of the accommodating recess 115. The second glue substance 14 is in the first gap G1 and connected to the first lateral surface 132 of the wavelength conversion structure 13 and the third lateral surface 122 of the first glue substance 12. The third glue substance 17 is in the second gap G2 and connected to the second lateral surface 133 of the wavelength conversion structure 13 and the fourth lateral surface 123 of the first glue substance 12.

As shown in FIG. 7 and FIG. 8, the wavelength conversion device 1b of the embodiment further includes a recess 18 and a weight structure 19. The recess 18 is inward in the second surface 112 of the substrate 11, and the weight structure 19 is disposed in the recess 18. Specifically, for example, the recess 18 of the embodiment is formed in the second surface 112 of the substrate 11 after punching the first surface 111 of the substrate 11 to form the accommodating recess 115. However, the invention is not limited to the method of forming the recess 18. In other embodiment, the accommodating recess 115 and the recess 18 can formed by punching the first surface 111 and the second surface 112 of the substrate 11 respectively.

Figure 9:
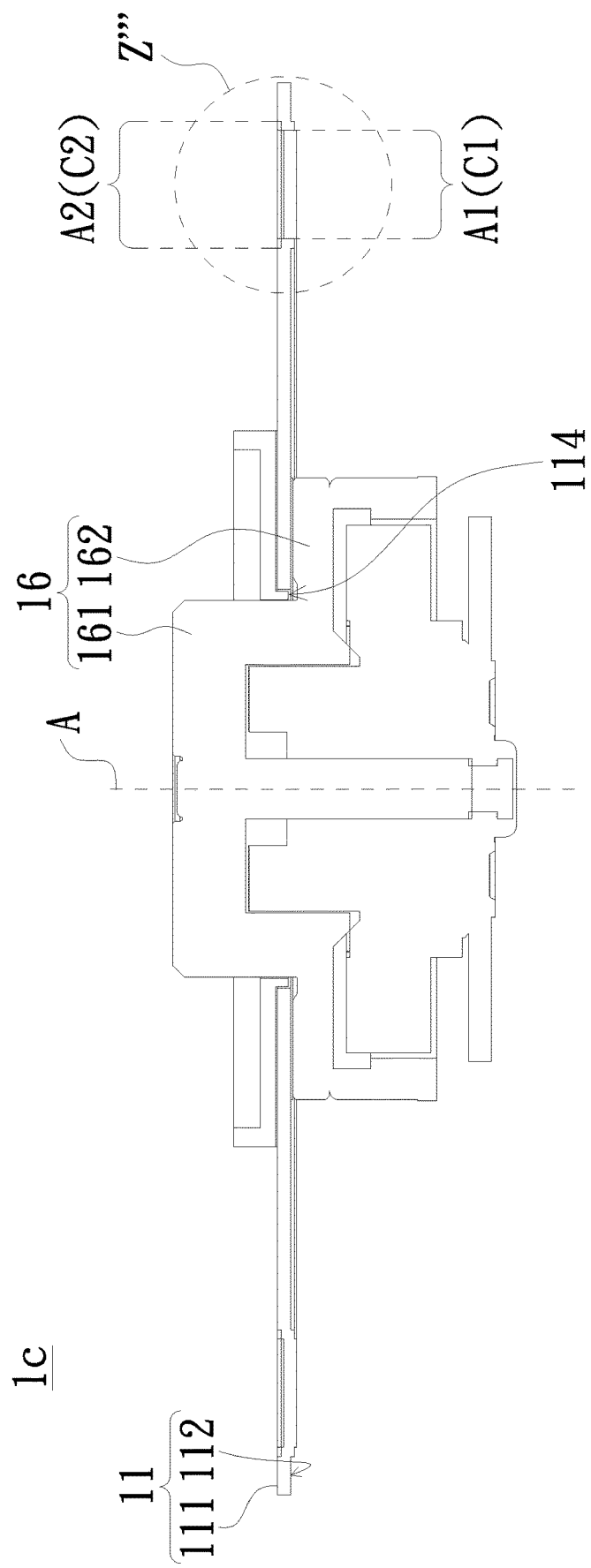
FIG. 9 illustrates a cross-sectional view of a wavelength conversion device according to another embodiment of the invention.
Figure 10:
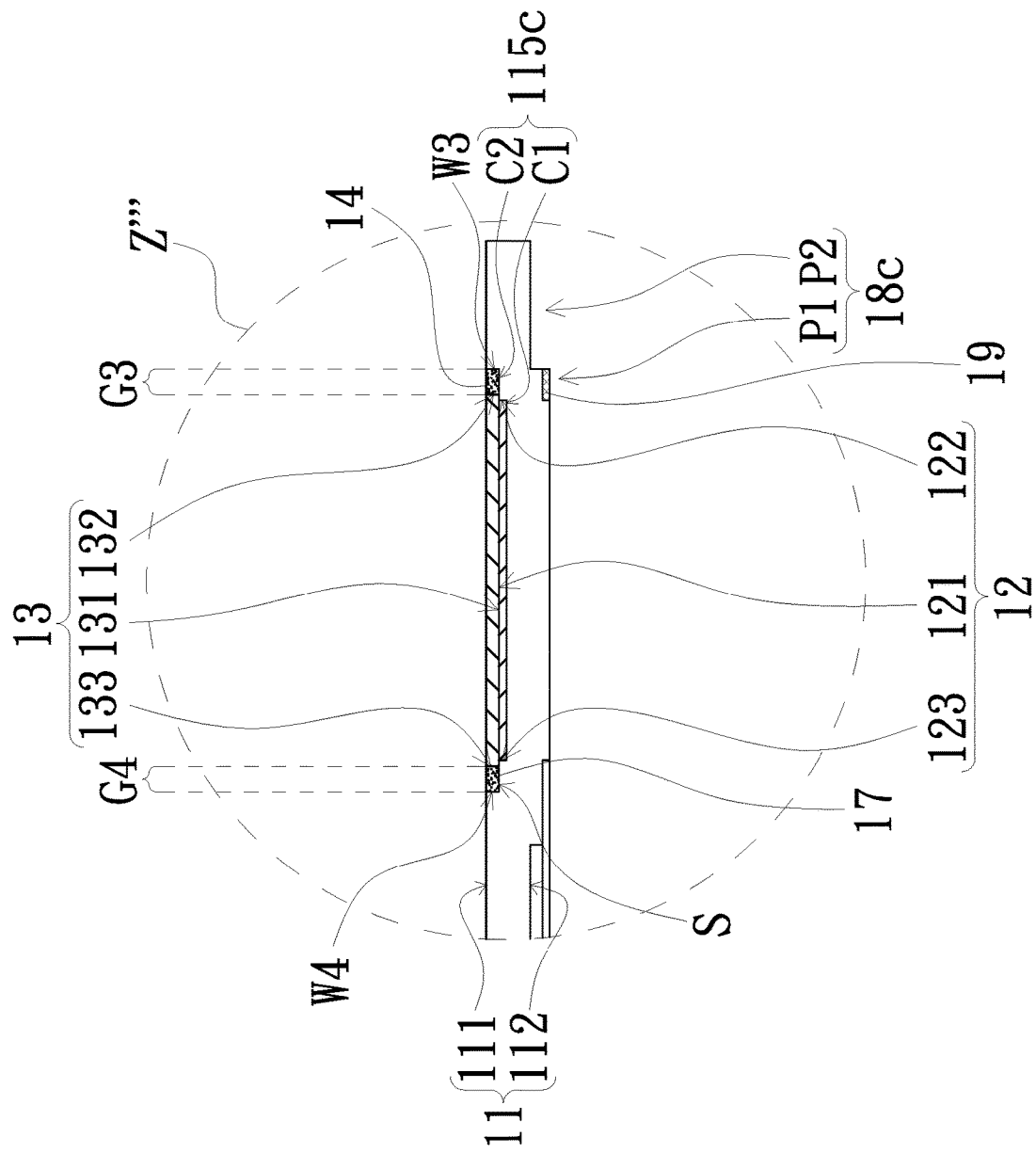
FIG. 10 illustrates an enlarged view of an area Z''' shown in FIG. 9.

Referring to FIG. 9 and FIG. 10, FIG. 9 illustrates a cross-sectional view of a wavelength conversion device according to another embodiment of the invention. FIG. 10 illustrates an enlarged view of an area Z'" shown in FIG. 9. As shown in FIG. 7 and FIG. 8, a wavelength conversion device 1c of the embodiment is similar to the wavelength conversion device 1b as shown in FIGS. 7 and 8, where the difference is that the substrate 11 of the wavelength conversion device 1c has an accommodating recess 115c that is different from the accommodating recess 115 shown in FIGS. 7 and 8. As shown in FIG. 9 and FIG. 10, the accommodating recess 115c of the embodiment is inward in the first surface 111 of the substrate 11. The accommodating recess 115c includes a first inward part C1 close to the second surface 112 and a second inward part C2 away from the second surface 112 in the extension direction perpendicular to the axis A of the first surface 111. The first inward part C1 and the second inward part C2 of the accommodating recess 115c are connected to each other. The cross-sectional area A2 of the second inward part C2 is larger than the cross-sectional area A1 of the first inward part C1, and a step surface S is formed at the junction between the second inward part C2 and the first inward part C1. In the embodiment, the first glue substance 12 is disposed in the first inward part C1 of the accommodating recess 115c, whereas the wavelength conversion structure 13 is disposed in the second inward part C2 of the accommodating recess 115c, where the wavelength conversion structure 13 abuts the first glue substance 12 and the step surface S. In addition, the second inward part C2 of the accommodating recess 115c has a third inner wall W3 and a fourth inner wall W4, where the third inner wall W3 is opposite to the fourth inner wall W4, and the step surface S is connected between the third inner wall W3 and the fourth inner wall W4. In addition, there is a third gap G3 formed between the first lateral surface 132 of the wavelength conversion structure 13 and the third inner wall W3 of the second inward part C2. There is a fourth gap G4 formed between the second lateral surface 133 of the wavelength conversion structure 13 and the fourth inner wall W4 of the second inward part C2. The second glue substance 14 is connected to the first lateral surface 132 of the wavelength conversion structure 13 and located in the third gap G3. The third glue substance 17 is connected to the second lateral surface 133 on the wavelength conversion structure 13 and located in the fourth gap G4.

As shown in FIG. 9 and FIG. 10, the wavelength conversion device 1c of the embodiment further includes a recess 18c and a weight structure 19. The recess 18c is inward in the second surface 112 of the substrate 11. The recess 18c includes a first part P1 and a second part P2. The weight structure 19 is for example disposed in the first part P1 of the recess 18c, but the invention is not limited thereto. In other embodiment, the weight structure 19 is for example disposed in the second part P2 of the recess 18c (not shown). Specifically, for example, the recess 18c of the embodiment is formed in the second surface 112 of the substrate 11 after the accommodating recess 115c is formed by punching the first surface 111 of the substrate 11. For example, the embodiment and the sequence are not limited. The accommodating recess 115c is formed by punching the first surface 111 of the substrate 11 to form the second inward part C2. At the same time, the second part P2 of the second recess 18c is formed in the second surface 112 of the substrate 11. Then, the bottom wall of the second inward part C2 is punched to form the first inward part C1. At this time, the first part P1 of the recess 18c is formed in the second surface 112 of the substrate 11. The invention does not limit the formation of the recess 18c. However, in other embodiment, the accommodating recess 115c and the recess 18c may be respectively formed in the first surface 111 and the second surface 112 of the substrate 11 by punching.

Figure 11:
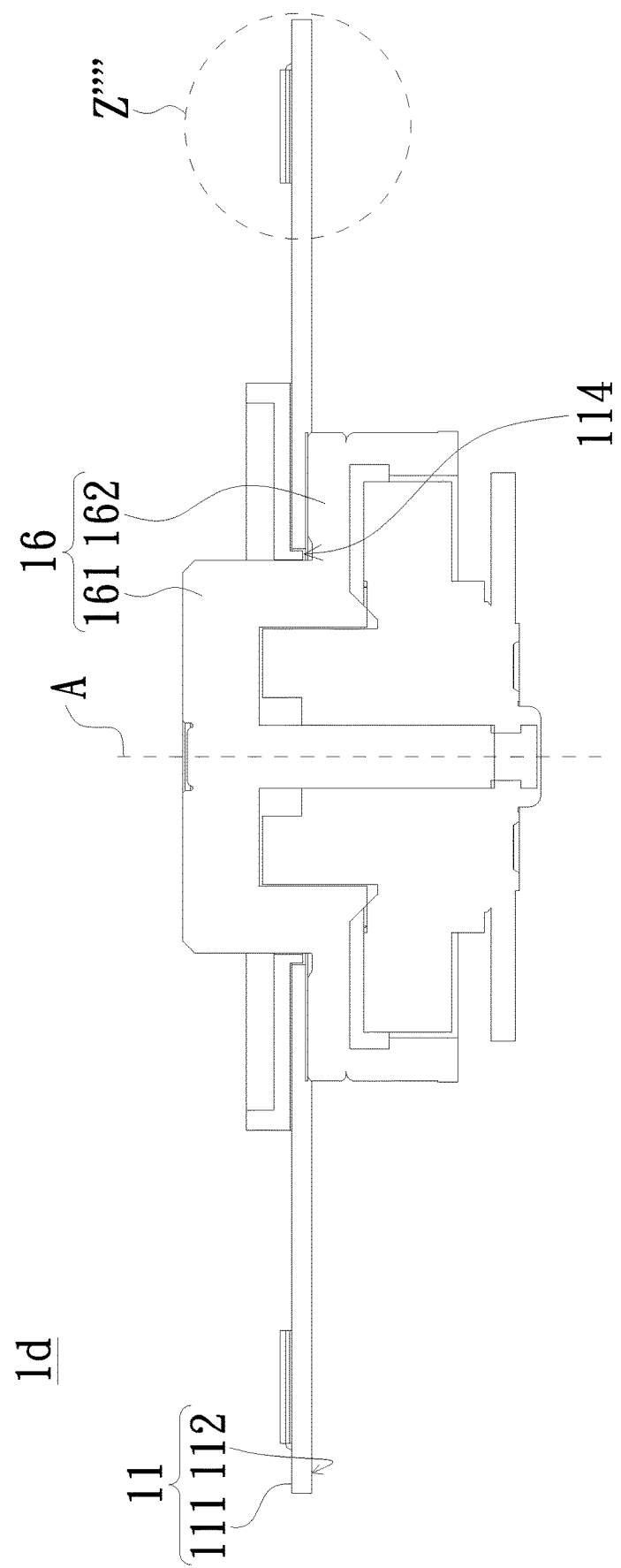
FIG. 11 illustrates a cross-sectional view of a wavelength conversion device according to another embodiment of the invention.
Figure 12:
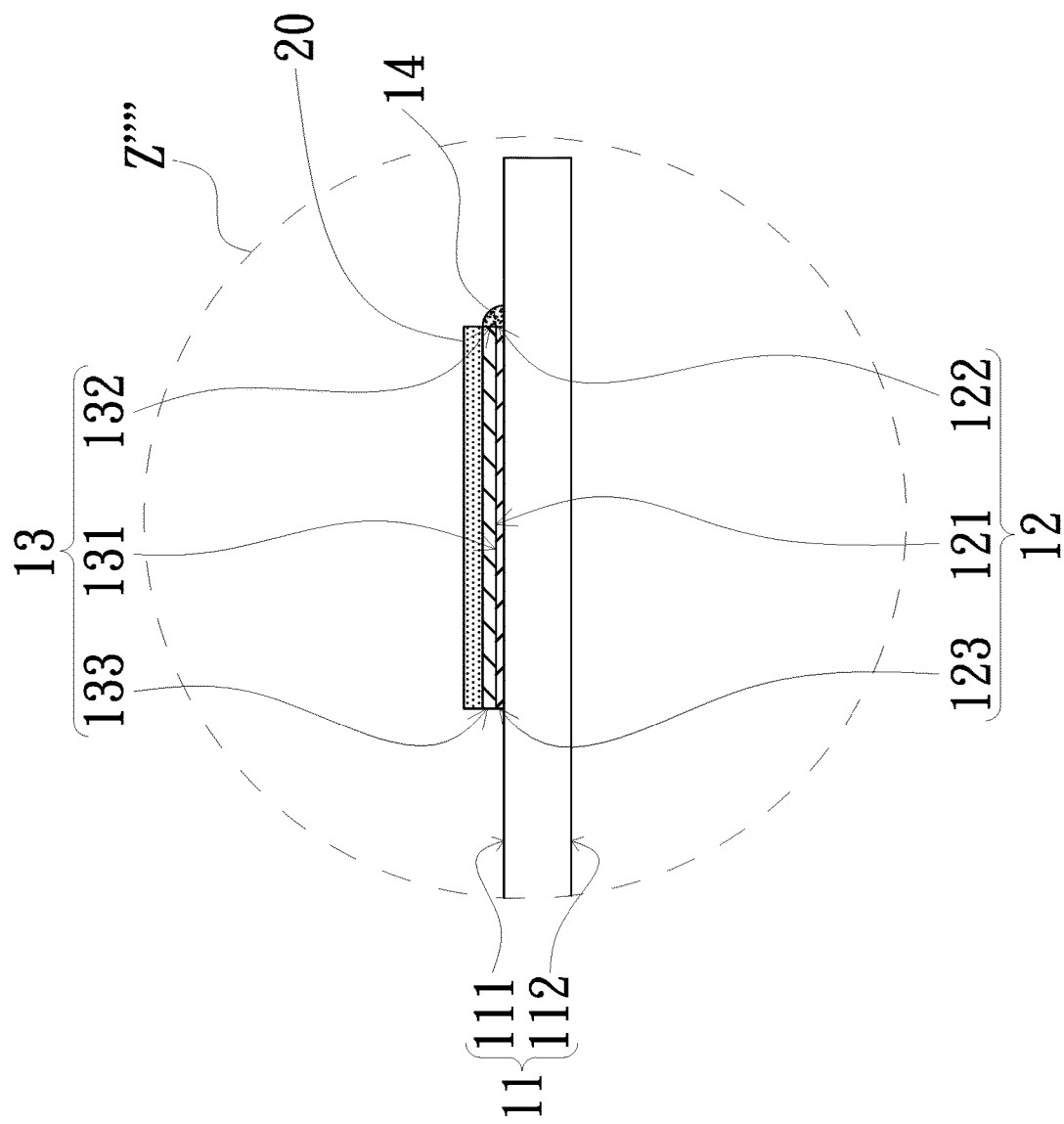
FIG. 12 illustrates an enlarged view of an area Z'''' shown in FIG. 11.

Referring to FIG. 11 and FIG. 12, FIG. 11 illustrates a cross-sectional view of a wavelength conversion device according to another embodiment of the invention. FIG. 12 illustrates an enlarged view of an area Z'''' shown in FIG. 11. As shown in FIG. 11 and FIG. 12, the wavelength conversion device 1d of the embodiment is similar to the wavelength conversion device 1 shown in FIG. 2 to FIG. 4, where the difference is that the wavelength conversion device 1 of the embodiment further includes an anti-reflective structure 20. The anti-reflective structure 20 is disposed on the wavelength conversion structure 13 and in the extension direction perpendicular to the axis A of the first surface 111. The wavelength conversion structure 13 is located between the anti-reflective structure 20 and the first glue substance 12. The purpose of disposing the anti-reflective structure 20 on the wavelength conversion structure 13 is to increase the ratio that the light beam hits the wavelength conversion structure 13, and to cause the color light beam generated by the wavelength conversion structure 13 to pass through the wavelength conversion structure 13 and the anti-reflective structure 20, where the anti-reflective structure 20 may be an anti-reflecting coating layer with a reflective material. It is to be noted that the anti-reflective structure 20 may also be disposed in the frame of the wavelength conversion devices in the different embodiments described above.

To sum up, the wavelength conversion device of the embodiment in the invention includes a wavelength conversion structure disposed on the substrate via the first glue substance. The lateral surface of the wavelength conversion structure is connected to the second glue substance. Based on such a structural design, the structure strength and the reliability of the wavelength conversion device can be significantly improved. Moreover, the exciting beam passing by the wavelength conversion structure can be reflected or scattered by the first glue substance and the second glue substance to return to the wavelength conversion structure for exciting again, so as to increase using efficiency of the wavelength conversion effectively, thereby increasing whole luminous efficiency.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A wavelength conversion device, comprising:
   a substrate, comprising a first surface, a second surface, an accommodating recess and an axis, wherein the first surface is opposite to the second surface, the accommodating recess is inward in the first surface and the accommodating recess comprises a first inward part away from the first surface and a second inward part close to the first surface, wherein the first inward part and the second inward part are connected to each other, and a cross-sectional area of the second inward part is larger than a cross-sectional area of the first inward part, wherein a step surface is formed at a junction between the second inward part and the first inward part;
   a first glue substance, surrounding the axis, wherein the first glue substance is disposed in the first inward part and the first glue substance comprises a first adhesive and a first reflective material;
   a wavelength conversion structure, disposed on the first glue substance and surrounding the axis, wherein the wavelength conversion structure is disposed in the second inward part and abuts the first glue substance and the step surface and the wavelength conversion structure comprises:
      a first bonding surface;
      a first lateral surface; and
      a second lateral surface, wherein the first bonding surface faces to the first glue substance and is connected between the first lateral surface and the second lateral surface, and the first lateral surface faces in a direction away from the axis, the second lateral surface faces in a direction close to the axis; and
   a second glue substance, connected to the first lateral surface of the wavelength conversion structure and surrounding the axis.

2. The wavelength conversion device of claim 1, wherein the first glue substance comprises a second bonding surface, a third lateral surface, and a fourth lateral surface, and the second bonding surface faces to the wavelength conversion structure and is connected between third lateral surface and the fourth lateral surface, wherein the third lateral surface faces in a direction away from the axis, whereas the fourth lateral surface faces in a direction close to the axis, wherein the second glue substance is connected to the first lateral surface of the wavelength conversion structure and the third lateral surface of the first glue substance.

3. The wavelength conversion device of claim 1, further comprising a third glue substance, wherein the third glue substance is connected to the second lateral surface of the wavelength conversion structure and surrounds the axis of the substrate, and the wavelength conversion structure is disposed between the second glue substance and the third glue substance.

4. The wavelength conversion device of claim 3, wherein the first glue substance, the second glue substance, and the third glue substance are arranged in a concentric ring arrangement in a radial direction from the axis.

5. The wavelength conversion device of claim 1, further comprising an anti-reflective structure disposed on the wavelength conversion structure, and the wavelength conversion structure located between the anti-reflective structure and the first glue substance.

6. The wavelength conversion device of claim 1, wherein and the second glue substance comprises a second adhesive and a second reflective material, wherein a percentage by weight of the first reflective material is more than or equal to 50% and less than or equal to 70%, and a percentage by weight of the second reflective material is more than or equal to 40% and less than or equal to 60%.

7. The wavelength conversion device of claim 1, further comprising a light-transmission component, wherein the substrate further comprises a through recess, and the light-transmission component is disposed in the through recess to form a light penetrating area adjacent to the wavelength conversion structure.

8. The wavelength conversion device of claim 1, wherein the second inward part of the accommodating recess has a third inner wall and a fourth inner wall opposite to the third inner wall, and the step surface is connected between the third inner wall and the fourth inner wall, wherein there is a third gap formed between the first lateral surface of the wavelength conversion structure and the third inner wall, and there is a fourth gap formed between the second lateral surface of the wavelength conversion structure and the fourth inner wall, wherein the second glue substance is located in the third gap.

9. The wavelength conversion device of claim 8, further comprising a third glue substance connected to the second lateral surface of the wavelength conversion structure and surrounding the axis of the substrate, wherein the wavelength conversion structure is located between the second glue substance and the third glue substance, and the third glue substance is located in the fourth gap.

10. The wavelength conversion device of claim 1, further comprising at least a recess and a weight structure, wherein the recess is inward in the second surface of the substrate, and the weight structure is disposed in the recess.

11. A projector, comprising an illumination system, a light valve, and a lens,
   wherein the illumination system comprises a light source device and a wavelength conversion device,
   wherein the light source device is used to provide an exciting beam,
   wherein the wavelength conversion device is disposed on a transmission path of the exciting beam, the wavelength conversion device is used to convert the exciting beam to an illumination beam, and the wavelength conversion device comprises:
      a substrate, comprising a first surface, a second surface, an accommodating recess and an axis, wherein the first surface is opposite to the second surface, the accommodating recess is inward in the first surface and the accommodating recess comprises a first inward part away from the first surface and a second inward part close to the first surface, wherein the first inward part and the second inward part are connected to each other, and a cross-sectional area of the second inward part is larger than a cross-sectional area of the first inward part, wherein a step surface is formed at a junction between the second inward part and the first inward part;

a first glue substance, surrounding the axis, wherein the first glue substance is disposed in the first inward part and the first glue substance comprises a first adhesive and a first reflective material;

a wavelength conversion structure, disposed on the first glue substance and surrounding the axis, wherein the wavelength conversion structure is disposed in the second inward part and abuts the first glue substance and the step surface and the wavelength conversion structure comprises a first bonding surface, a first lateral surface, and a second lateral surface, wherein the first bonding surface faces to the first glue substance and is connected between the first lateral surface and the second lateral surface, wherein the first lateral surface faces in a direction away from the axis, whereas the second lateral surface faces in a direction close to the axis; and a second glue substance, connected to the first lateral surface of the wavelength conversion structure and surrounding the axis; and wherein the light valve is disposed on a transmission path of the illumination beam, and used to convert the illumination beam to an image beam, and wherein the lens is disposed on a transmission path of the image beam, and used to convert the image beam to a projection beam.

\* \* \* \* \*